US006303916B1

(12) United States Patent
Gladnick

(10) Patent No.: US 6,303,916 B1
(45) Date of Patent: Oct. 16, 2001

(54) SYSTEMS AND METHODS FOR GENERATING REPRODUCIBLE ILLUMINATION

(75) Inventor: Paul G. Gladnick, Seattle, WA (US)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/220,705

(22) Filed: Dec. 24, 1998

(51) Int. Cl.[7] .............................. G01J 1/32; H05B 41/36
(52) U.S. Cl. ........................................... 250/205; 315/158
(58) Field of Search ............................... 250/205, 214 R, 250/214 AL, 214 B, 214 C, 214 AG, 226, 238, 552; 315/307, 308, 309, 149, 158; 356/426

(56) References Cited

U.S. PATENT DOCUMENTS

| | | | | |
|---|---|---|---|---|
| 4,375,067 | * | 2/1983 | Kitamura | 250/205 |
| 4,832,491 | * | 5/1989 | Sharpe et al. | 250/214 C |
| 4,998,043 | * | 3/1991 | Unami et al. | 250/205 |
| 5,514,864 | | 5/1996 | Mu-Tung et al. | 250/205 |
| 5,753,903 | | 5/1998 | Mahaney | 250/205 |
| 5,923,427 | * | 7/1999 | Dong | 250/205 |

FOREIGN PATENT DOCUMENTS

| | | | | |
|---|---|---|---|---|
| 63-271225 A | * | 11/1988 | (JP) | 250/205 |
| WO 95/15060 | | 6/1995 | (WO) . | |
| WO 96/05693 | | 2/1996 | (WO) . | |
| WO 96/11377 | | 4/1996 | (WO) . | |

* cited by examiner

*Primary Examiner*—John R. Lee
*Assistant Examiner*—Kevin Pyo
(74) *Attorney, Agent, or Firm*—Oliff & Berridge, PLC

(57) ABSTRACT

A plurality of systems and methods for generating reproducible illumination by adjusting solid-state devices regulated by a control system that illuminate sample parts in a compensated, standardized manner. An illumination system includes an illumination source directed onto the optical axis of a light collection system. The light collection system includes a collection lens assembly and at least one CCD detector. The lens assembly and CCD detector perform the spatial imaging of the sample part. An optical element positioned between the illumination source and the sample part redirects a portion of the entire energy emitted from the illumination source to a monitoring detector. The monitoring detector measures the optical power illuminating the sample part and compares it to a previously measured reference illumination source level. Based on the results of the comparison and additional input from temperature, color and other sensor, the drive current to the illuminating source is adjusted to consistently illuminate the sample part within an instrument model line and over an extended time period.

20 Claims, 7 Drawing Sheets

SYSTEMS AND METHODS FOR GENERATING REPRODUCIBLE ILLUMINATION

BACKGROUND OF THE INVENTION

1. Field of Invention

This invention relates to systems and methods that standardize reproducible illumination within an instrument line. In particular, the invention is directed to an illumination system that preferably uses solid-state devices regulated by a control system to illuminate sample parts. The illumination system is calibrated with a reference illumination source to provide stable, compensated standardized systems and methods that measure the intensity of light used to illuminate a sample part.

2. Description of Related Art

Current commercial metrology systems based on video inspection almost exclusively use tungsten filament lamps, e.g., halogen lamps, when performing measurements transmission, direct reflection or diffuse illumination modes. Halogen lamps are typically used because they have a reliable lifetime of approximately 2000 hours. These lamps also have sufficient energy in the visible portion of the spectrum and are relatively inexpensive. These lamps have characteristics similar to blackbodies near 2700 K–3200 K.

As a result of the broadband emission characteristics of halogen lamps, a majority of the commercial vision measurement system manufacturers spectrally limit the radiation emitted from the halogen lamps to exclude, for example, radiation in the wavelength range from 750 nm to 3.5 $\mu$m. This can raise the signal to noise ratio (SNR) for measurements performed in the visible region and permits a reduction in the sophistication required of the imaging optics. The spectral limitation also excludes a radiometrically sensitive region for silicon from being exploited for vision measurements.

However, incorporating hardware to operate halogen-lamp-based illumination systems is bulky, expensive and relatively unreliable compared to illumination systems using solid-state sources. Conventional vision systems have minimum requirements for spectrally unfiltered optical power on the order of 25 watts for illumination sources. Driving such illumination systems translates to source currents in the range of, for example, 0.6–2.0 amperes. Other vision systems can have even higher current drive requirements.

Typically, conventional illumination sources are remotely located because a significant amount of heat is generated by the illumination sources. If the heat generated by the illumination system is not accounted for, the accuracy of dimensional measurements in vision instruments could be compromised. The illumination sources are therefore spectrally low-pass filtered at, for example, a wavelength of about 750 nm.

Hence, an apparatus is needed to transport the light from the remote location of the illumination source to the point of use or measurement. Typically, this is accomplished using multimode glass fiber bundles. However, even low quality illumination bundles are known to be expensive, fragile and often not necessary for most users from a convenience standpoint.

SUMMARY OF THE INVENTION

The response time of conventional lamps to achieve steady state illumination after a step change in illumination level is on the order of seconds. This is due to the large thermal mass of the device, including primarily the filament and the glass envelope. Solid-state devices afford a tremendous advantage because they have high modulation capabilities and good frequency response characteristics. Thus, because of the advantages provided by solid-state devices, the solid-state devices can attain steady-state conditions faster than conventional lamps. This improves the value of the machine vision instrument by raising the instrument throughput.

The light output of any device is a function of many variables. Some of the variables include the instantaneous drive current, the age of the device, the ambient temperature, whether there is any dirt or residue on the light source, the performance history of the device, etc. Machine vision instrument systems typically locate objects within their field of view using methods which may determine, among other things, the contrast within the region of interest where the objects may be found. To some degree, this determination is significantly affected by the amount of incident light.

Automated video inspection metrology instruments generally have a programming capability that allows an event sequence to be defined by the user. This can be implemented either in a deliberate manner, such as programing, for example, or through a recording mode which progressively learns the instrument sequence. The sequence commands are stored as a program. The ability to create programs with instructions that perform a sequence of instrument events provides several benefits.

For example, more than one workpart or instrument sequence can be performed with an assumed level of instrument repeatability. In addition, a plurality of instruments can execute a single program, so that a plurality of inspection operations can be performed simultaneously or at a later time. Additionally, the programming capability provides the ability to archive the operation results. Thus, the testing process can be analyzed and potential trouble spots in the workpart or breakdowns in the controller can be identified. Without adequate standardization and repeatability, archived programs vary in performance over time and within different instruments of the same model and equipment. Illumination level variation can be effectively minimized and standardized by actively sampling a small percentage of the entire light output from each illumination source, comparing the light output to a target point level established through an instrument standardization process, and controlling the illumination sources based on the comparison.

This invention separately provides systems and methods that allow an illumination system using solid-state devices to be regulated using a control system to yield stable and standardized illumination of a sample part.

In one exemplary embodiment, the systems and methods according to this invention have the flexibility to measure light intensities in the visible and near infrared regions of the spectrum. In addition, the magnitude of a required drive current for the systems and methods according to this invention makes precise current adjustment easy, so that reproducible illumination within an instrument product line is achievable.

The systems and methods according to this invention use solid-state devices to illuminate the sample part. The solid-state devices require small drive currents to operate. It is thus easy to precisely adjust the drive currents of the solid-state devices. The precise nature of the solid-state devices allows for greater flexibility in selecting the output wavelength of the solid-state devices. Accordingly, the illumination source can be located near the illuminated sample part. As a result, the conventional glass fiber bundles are not necessary, making the systems and methods according to this invention compact, affordable and reliable. In addition, the solid-state devices provide very high optical repeatability and reliability when driven electronically within the working parameters of the solid-state devices.

The solid-state devices are a component of an illumination source that can illuminate a sample part along an axis of illumination that is perpendicular to a plane on which the sample part is placed. The solid-state devices usable in the systems and methods according to this invention may include, but are not limited to, light emitting diodes (LEDs). LEDs are selected because of their reliability and long-life. LEDs also have the ability to work in the ultra-violet, visible and near infrared regions of the spectrum.

A light collection system forms an image of the illuminated sample part In one mode, the light collection system has an optical axis that is coincident with the axis of illumination of the illumination source. In one exemplary embodiment, the light collection system preferably includes at least one charge coupled device (CCD) and at least one collection lens. The solid-state devices emit optical output energy in a part of the spectral region where the CCD is photosensitive. An optical element is positioned between the illumination source and the sample part. It is within the scope of the systems and methods of this invention to use a dichroic or common beam splitter as the optical element. Any other known or later developed optical element capable of transmitting and reflecting the optical output energy from the illumination source simultaneously can also be used with the systems and methods of this invention.

The illumination source is also directed onto an optical axis of the light collection system. It is within the scope of the systems and methods according to this invention to illuminate the sample part in the transmission mode. Alternatively, the sample part can be illuminated in the reflective mode (specular or diffuse). In another aspect of the systems and methods according to this invention, the sample part can also be illuminated using a combination of the transmission and reflective modes. In yet another aspect of the systems and methods according to this invention, the sample part can also be illuminated obliquely, using the "dark field" illumination mode.

When the sample part is illuminated in the transmission mode, the optical element is placed between the illumination source and the sample part. As a result, a small portion of the entire optical output energy emitted from the illumination source is redirected to a monitoring detector. The remainder of the emitted optical output energy illuminates the sample part, from which the light collection system forms an image.

When the sample part is illuminated in the reflective mode, the optical element is also positioned between the illumination source and the sample part. As a result, a small portion of the entire emitted optical output energy from the illumination source passes through the optical element and is received by the monitoring detector. The remainder of the optical output energy is directed towards the sample part. The remainder of the emitted optical output energy is focused onto the sample part by a focusing or collecting lens. The focused optical output energy illuminates the sample part and is reflected or scattered back towards the focusing or collecting lens. The reflected or scattered optical output energy is imaged onto a CCD.

The systems and methods of this invention can be modified to include an additional collection device having multiple non-imaging detectors capable of measuring average spectral content. In particular, such non-imaging detectors do not need to measure spatial information. Such non-imaging detectors include, for example, color ratiometric detectors. Multi-element detectors with mosaic spectral filters could be used. Alternatively, a single element detector with a spectral filter wheel could be used.

The systems and methods of this invention are calibrated in situ to provide a consistent image of a sample part. In addition, the systems and methods of this invention require only a small drive current to drive the illumination source. The small drive current can be adjusted by the user to optimally illuminate colored sample parts. Further, the systems and methods of this invention provide a stable and standardized method for illuminating a sample part over a long period of time.

These and other objects of the invention will be described in or be apparent from the following description of the examplary embodiments.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
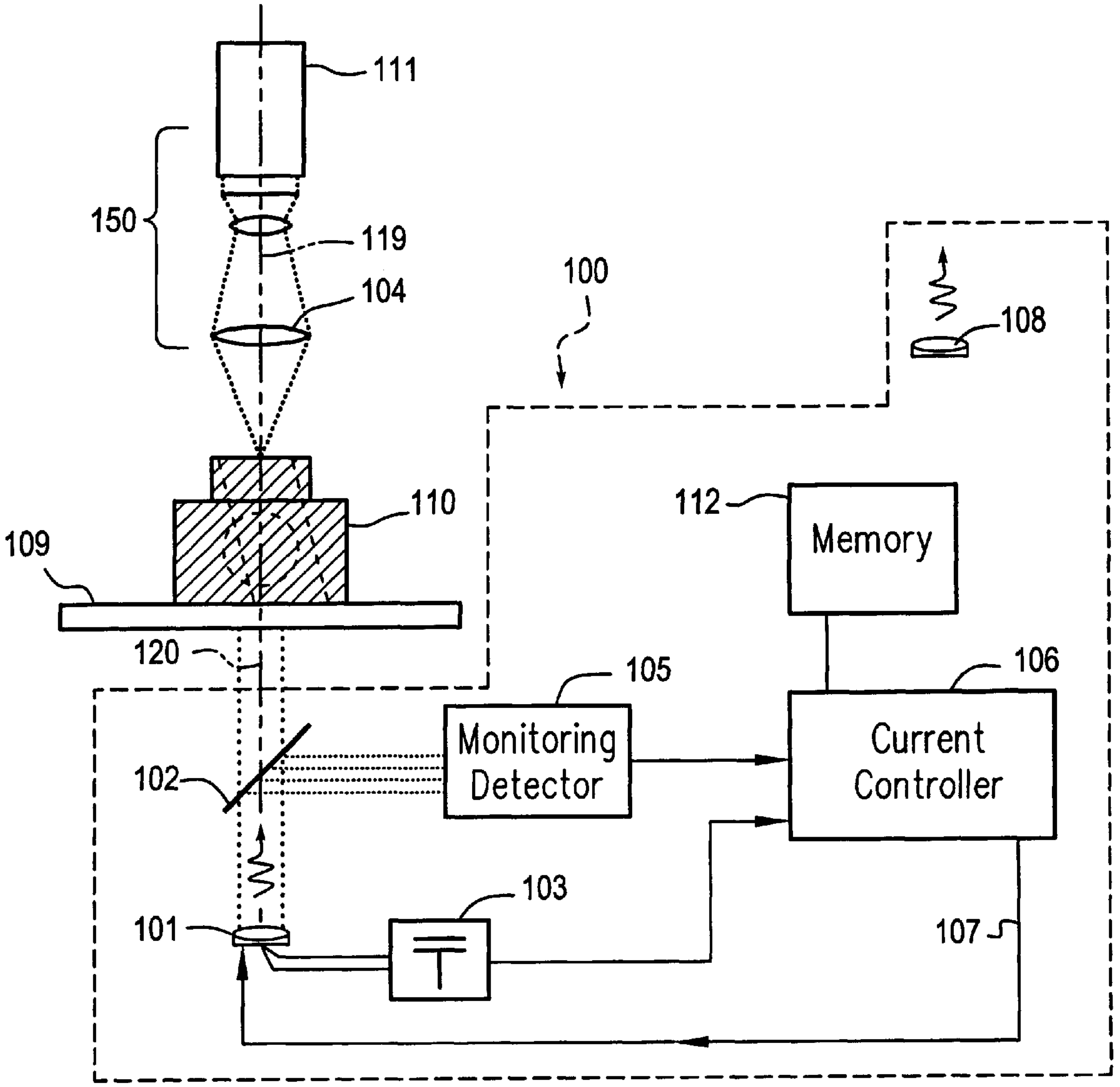
FIG. 1 is a block diagram of one exemplary embodiment of an illumination system according to this invention that uses a transmission mode to illuminate a sample part.

FIG. 1 is a block diagram of a system 100 using a transmission mode for illuminating a sample part 110. The system 100 uses solid-state devices for illumination because of their stability and long-life. The solid-state devices may include light emitting diodes (LEDs). The solid state devices may operate in the visible and/or near-infrared regions of the spectrum. The solid-state devices operate in the spectral regions that charge coupled devices (CCDs) are known to be photosensitive in, such as, for example 360 nm–1100 nm.

LEDs are preferably used because LEDs are more amenable to precise optical power regulation than halogen lamps. This is due to the smaller drive currents needed to operate the LEDs. In addition, the discrete nature of LEDs allows the wavelength of the emitted light to be more flexibly selectable. Also, when driven electronically within the working parameters of the LEDs, the repeatability and reliability of the LEDs' optical output energy are both very high. In addition, some LEDs are capable of emitting light in the ultra-violet A frequency range, which is used to improve the resolving power of imaging optics.

The solid-state devices used for the illumination source may be surface mounted or acrylic-encapsulated LED packages. For example, surface-mounted solid-state devices can be combined with collection and/or collimation lenses to form the illumination source. The illumination source can then multiplex among the individual solid-state devices to optimally illuminate the sample part. In addition, for multi-wavelength addressable devices, the illumination source can match or avoid the average spectral absorption properties of the sample part within the field of view to enhance the image contrast. The capability to standardize the light system with respect to color illumination selection within an instrument line is a valuable feature when inspecting colored parts.

As shown in FIG. 1, the system 100 illuminates a sample part 110 placed on a transparent plane 109. The transparent plane 109 is movable in two orthogonal directions. The system 100 includes an illumination source 101 and data stored in a memory 112 representing a reference illumination source 108. A light collection system 150 includes a collection lens assembly 104 and a CCD detector 111. In particular, the CCD detector 11 has an optical axis 119 parallel to, and preferably coincident with, an axis of illumination 120 of the illumination source 101. The illumination source 101 may be directed onto the optical axis 119 of the light collection system 150. Illumination is made at or near a perpendicular direction to the plane 109 in the transmission mode. The light collection system 150 forms an image of the illuminated sample part 110.

An optical element 102 is positioned between the illumination source 101 and the sample part 110. The optical element 102 may be a dichroic plate or other beam splitter. Any other known or later developed optical element capable of simultaneously transmitting and reflecting optical output energy can also be used as the optical element 102. The optical element 102 redirects a small percentage of the entire optical output energy emitted from the illumination source 101 to a monitoring detector 105, as shown by the dotted lines in FIG. 1. The remainder of the emitted optical output energy illuminates the sample part 110 from which the light collection system 150 forms an image.

The monitoring detector 105 measures at least one characteristic of the optical output energy emitted from the illumination source 101 before the CCD detector 111 captures an image of the sample part 110. Furthermore, the monitoring detector 105 ensures that the sample part 110 does not influence the source monitor measurement and permits standardizing one illumination system with a plurality of similar illumination systems found in corresponding instruments within a product line. As such, the monitoring detector 105 is able to measure such characteristics as, for example, the intensity of light emitted by the illumination source 101. The monitoring detector 105 is also able to measure the intensity of light emitted by a certain color from a color device within the illumination source 101 by electronically selecting the spectral bandwidth of the emitted light. The monitoring detector 105 is capable of measuring characteristics of the optical output energy other than those listed above. The system 100 stabilizes and standardizes the level of the optical output energy emitted from the illumination source 101 based, at a minimum, on one or more of the characteristics measured by the monitoring device 105.

To standardize the output of the system 100, a reference illumination source 108 is used. The reference illumination source 108 should be similar in nature to the illumination source 101. Thus, if the illumination source 101 is an LED, the reference illumination source 108 should also be an LED. If the illumination source 101 is a combination of multi-color LEDs whose spectral bandwidths are electronically selectable, the reference illumination source 108 should also be a similar combination of LEDs, and so on. The reference illumination source 108 should be calibrated by a recognized or accredited organization, such as, for example, the National Institute of Standards and Technology (NIST). The characteristics of the optical output energy of the reference illumination source 108 are compiled into a calibration table stored in the memory 112. If addressable narrowband illumination sources are used in the machine vision instrument, a calibration table is created for each source. Since the characteristics of the optical output energy of the reference illumination source 108 are used to calibrate the monitoring detector 105 when the machine vision instrument is manufactured, the optical output energy emitted from the illumination source 101 of the machine vision instrument can be compared with corresponding characteristics of the optical output energy from the reference illumination source 108 found in the calibration table.

In particular, the calibration table obtained for the monitoring detector 105 provides the output current of the monitoring detector 105 as a function of the optical output energy from the reference illumination source 108. The calibration table resides in the memory 112 for each machine vision instrument. The calibration table correlates the optical output energy of the reference illumination source 108 input to the monitoring detector 105 and the current output by the monitoring detector 105.

Once the calibration table has been generated, the illumination source 101 of the machine vision instrument permanently replaces the reference illumination source 108. The optical output energy from the illumination source 101, as measured by the monitoring detector 105, can be compared to the optical output energy of the reference illumination source 108 in the calibration table stored in the memory 112. A lookup table is generated by comparing the optical output energy from the illumination source 101 to corresponding values of the reference illumination source 108 to provide a starting drive current which is output on line 107 for feedback iterations. The initial datum of the starting drive current is used to set the illumination source 101 drive current when performing iterative adjustment. The adjustment is halted when the optical output energy level of the illumination source 101 is within a prescribed acceptable range. An initial drive current is desired because the optical output energy from the illumination source 101 changes due to temperature, age, device differences, etc. The lookup table resides in the memory 112 of the system 100 and can be updated as required, thereby reducing iteration convergence time.

A temperature probe 103 is positioned near the illumination source 101 and the monitoring detector 105. Variations in the ambient temperature can affect the optical output energy levels of the illumination source 101 and the responsivity of the monitoring detector 105. The temperature probe 103 provides a real-time monitor of the ambient temperature of the illumination source 101 and the monitoring detector 105. The real-time ambient temperature can be used to compensate for variations in the optical output energy of the illumination source 101.

Variations in ambient temperature can affect the optical output energy of the illumination source 101 by as much as 20% within a reasonable operating temperature range of 15°

C.–35° C. Additionally, ambient temperature variations can affect the responsivity of the monitoring detector 105. In one exemplary embodiment, photodiodes are used for the monitoring detector 105 because the photodiodes have a nominal variation within the above-described temperature range of about 10%.

The temperature probe 103 outputs the real-time ambient temperature of the illumination source 101 to the current controller 106 as a processed electrical signal. Accordingly, the temperature probe 103 helps the system 100 compensate for ambient operating conditions, such as, for example, temperature drifts in the optical output energy of the illumination source 101 that would otherwise negatively affect the stability and performance of the illumination source 101.

The current controller 106 processes the electrical signal received from the temperature probe 103 and the output current received from the monitoring detector 105. The current controller 106 outputs a compensated drive current on the line 107 based on the data from the temperature probe 103 and the monitoring detector 105. The current controller 106 adjusts the optical output energy from the illumination source 101 using the compensated drive current output on the line 107. This adjustment persists until the optical output energy achieves a desired target point in agreement with the corresponding optical output energy for the appropriate reference illumination source 108 stored in the calibration table.

The target point is the level of the optical output energy from the illumination source 101 that illuminates the sample part 110, resulting in a consistent image of the sample part 110. In essence, the target point defines an image quality based on an illumination level rather than a device drive current level. The target point can be subjectively chosen by the operator to correspond to an acceptable quality image with which to perform dimensional inspection. Alternatively, the target point can also be objectively chosen by a suitable standard of measurement to provide the acceptable quality image. Additionally, the target point can be provided using a graphical user interface, passed as a specified value contained within a "part program", or determined from an appropriate algorithm. Thereafter, standardization and repeatability in establishing the same image brightness would follow a similar procedure.

To stabilize the system 100, the current controller 106 can also compensate for optical power changes. Such changes may result from differences in optical coupling efficiency and/or component variance among systems. Additionally, changes may result from low-frequency temperature drifts in the ambient environment that affect the illumination source 101 and the monitoring detector 105 or from current source fluctuations in driving the illumination source 101.

Further, a linearized scale of the illumination intensity level on the sample part 110 per selected wavelength may be provided to the user that is valid irrespective of the particular system 100, the age of the illumination source 101, the temperature of the illumination source 101 or the drive current supplied to the illumination source 101 on the line 107. In practice, the optical output energy is a non-linear function of the drive current. As a result, the illumination source intensity levels may be user-adjustable within ranges that do not greatly alter the optical output energy. Since most illumination sources display non-linear behavior, the adjustment made by a user may be counter-intuitive, would not optimize adjustment resolution, and would not correspond in a linear fashion to the amount of optical output energy from the illumination source 101. Further, a linearized, optical output energy, which is standardized via the reference illumination source 108, provides to the user a new, intuitive setting of the illumination level whose adjustment resolution can be optimized to better match the performance of the illumination device 101.

At least one characteristic of the optical output energy emitted by the illumination source 101 is measured by the monitoring detector 105. The characteristic of the optical output energy measured by the monitoring detector 105 is compared to a corresponding characteristic of the reference illumination source 108 stored in the calibration table, as the responsivity of the monitoring detector 105 will not measurably change. Any discrepancy between the optical output energy of the illumination source 101 and that of the corresponding value for the reference illumination source 108 found in the calibration table is minimized by adjusting the current output on the line 107 from the current controller 106 to the illumination source 101. The optical output energy emitted from the illumination source 101 is then remeasured by the monitoring detector 105. Iterative adjustment to obtain agreement between that measured from the illumination source 101 and the desired reference illumination source 108 is made based on an appropriate standard of measurement such as difference, maximum, minimum, etc.

Based on this iterative scheme, the drive current output by the current controller 106 on the line 107 to the illumination source 101 is adjusted to yield an illumination level onto the sample part 110 in accord with the reference illumination source 108.

The current controller 106 supplies a processed, compensated input drive current output on the line 107 to the illumination source 101 based on the real-time status of the optical output energy of the illumination source 101 via the monitoring detector 105 and the local environment temperature. Thus, the compensated input drive current signal output on line 107 is able to modify the optical output energy from the illumination source 101 so that it is in accordance with the reference illumination source 108. Hence, the current controller 106 adjusts the optical output energy emitted from the illumination source 101 using the compensated drive current signal output on the line 107 until the optical output energy achieves the desired target point.

Figure 2:
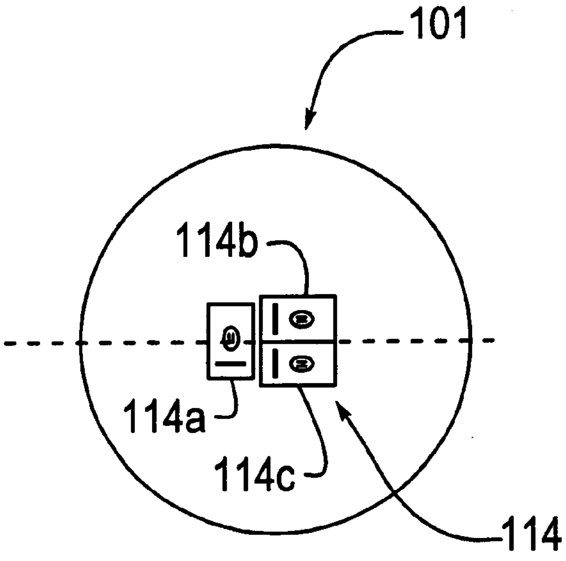
FIG. 2 is a plan view of the illumination source illustrating an example of the solid-state devices.

As shown in FIG. 2, one exemplary embodiment of the illumination source 101 uses solid-state devices 114. The solid-state devices 114 can be, but are not limited to, surface-mounted LEDs or an acrylic-encapsulated LED package. FIG. 2 shows three LEDs 114*a*, 114*b*, and 114*c* surface-mounted onto a substrate of the illumination source 101. The LEDs 114*a*, 114*b*, and 114*c* respectively operate, for example, in the red, green and blue spectral regions. Alternatively, some or all of the LEDs 114 could emit in the near infrared region of the spectrum, where better compatibility may be observed with some samples to be illuminated. This may be ideal for biological purposes, but is not limited to this use.

Figure 3:
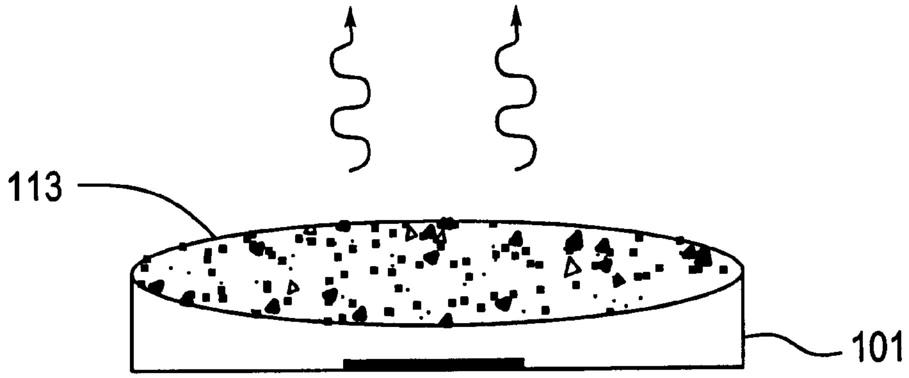
FIG. 3 is a perspective view of the illumination source illustrating an example of the collection lens.

FIG. 3 is a perspective view of the illumination source 101 illustrating an example of the solid-state devices 114 being combined with a collection lens 113 to form the illumination source 101. An advantage of combining the surface-mounted LEDs 114 and the collection lens 113 is the ability to multiplex the formed illumination source 101 among the individual LEDs to optimize the illumination of the sample part 110.

Figure 4:
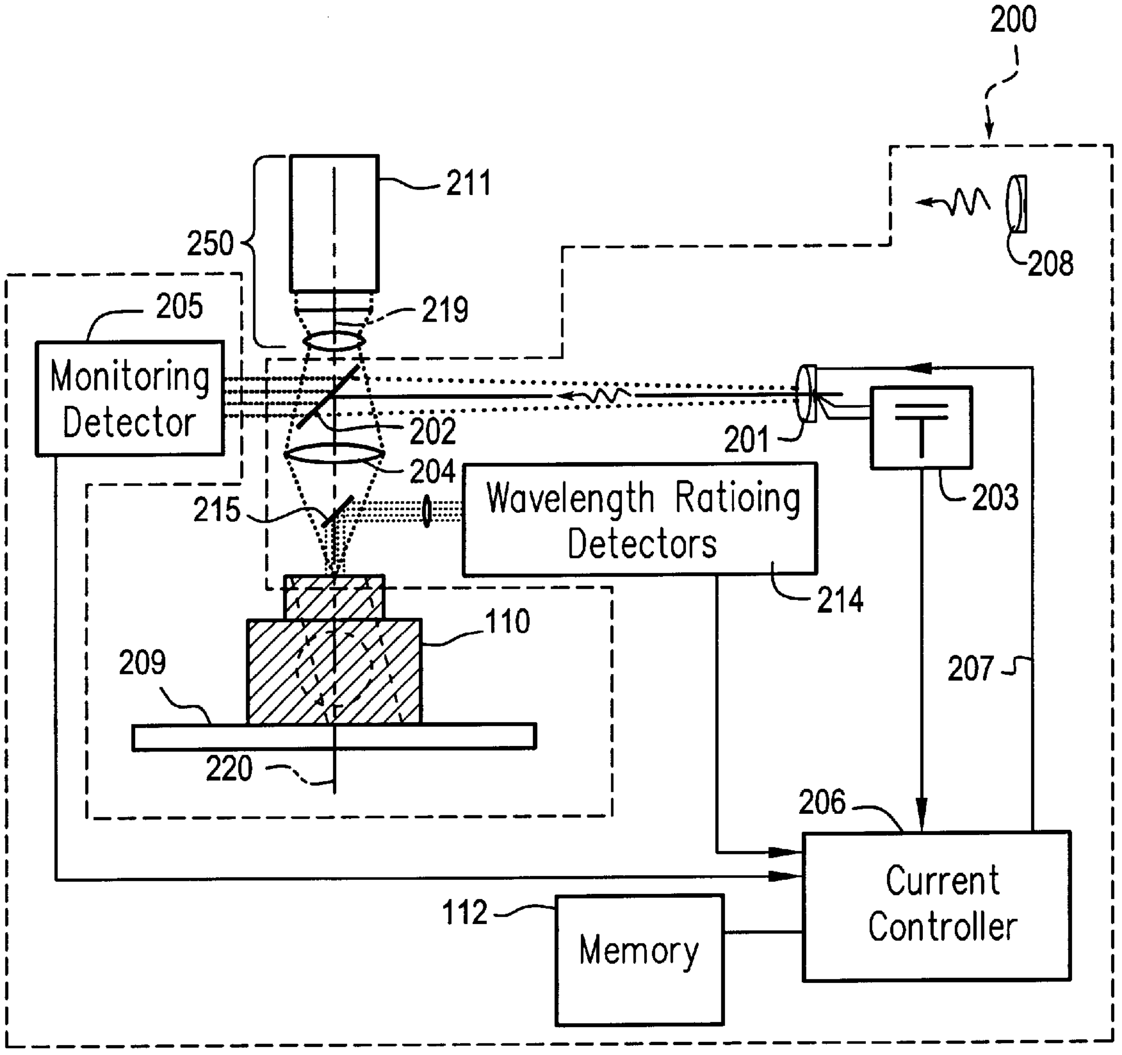
FIG. 4 is a block diagram of a second exemplary embodiment of an illumination system according to this invention that uses a reflective mode to illuminate a sample part.

FIG. 4 is a block diagram of a system 200 using a reflective mode for illuminating the sample part 110. The system 200 uses solid-state devices for illumination, as previously described. The system 200 illuminates the sample part 110 placed on a transparent plane 209. The transparent plane 209 is movable in two orthogonal directions. The system 200 includes an illumination source 201 and data stored in a memory 112 representing a reference illumination source 208. A light collection system 250 includes a collection lens assembly 204 and a CCD detector 211. The light collection system 250 forms an image of the illuminated sample part 110 onto the CCD detector 211.

The illumination source 201 is directed onto an optical axis 219 of the light collection system 250 by an optical element 202. Illumination is made at or near a perpendicular direction to the transparent plane 209 in the reflective type mode. The optical element 202 is positioned between the illumination source 201 and the sample part 110. The optical element 202 directs a small percentage of the entire emitted optical output energy from one illumination source 201 onto a monitoring detector 205, as shown by the dotted lines 230 in FIG. 4.

As discussed previously, the monitoring detector 205 measures at least one characteristic of the optical output energy emitted from the illumination source 201 before the CCD detector 211 captures an image of the sample part 110. In addition, the monitoring detector 205 is calibrated when the system 200 is manufactured using a corresponding reference illumination source 208, as discussed above. The monitoring detector 205 is a stable, compensated photodetector and is used to standardize the system 200.

To standardize the output of the system 200, the reference illumination source 208 is used. As discussed above, the reference illumination source 208 should be similar in nature to the illumination source 201. Also, the reference illumination source 208 should also be calibrated by a recognized or accredited organization, such as, for example, the National Institute of Standards and Technology (NIST). The characteristics of the optical output energy of the reference illumination source 208 are compiled into a calibration table residing in the memory 112. If addressable narrowband illumination sources are used in the machine vision instrument, a calibration table is created for each source. Since the optical output energy of the reference illumination source 208 is used to calibrate the monitoring detector 205 when the machine vision instrument is manufactured, the optical output energy of the illumination source 201 can be compared with the corresponding characteristics of the optical output energy from the reference illumination source 208 found in the calibration table.

In particular, the calibration table obtained for the monitoring detector 205 provides the output current of the monitoring detector 205 as a function of the optical output energy from the reference illumination source 208. The calibration table resides in the memory 112 for each machine vision instrument. The calibration table correlates the optical output energy of the reference illumination source 208 input to the monitoring detector 205 and the current output by the monitoring detector 205.

Once the calibration table has been generated, the illumination source 201 of the machine vision instrument permanently replaces the reference illumination source 208. The optical output energy from the illumination source 201, as measured by the monitoring detector 205, can be compared to the optical output energy of the reference illumination source 208 in the calibration table stored in the memory 112. A lookup table is generated by comparing the optical output energy from the illumination source 201 to corresponding values of the reference illumination source 208 to provide a starting drive current which is output on line 207 for feedback iterations. The initial datum of the starting drive current is used to set the illumination source 201 drive current when performing iterative adjustment. The adjustment is halted when the optical output energy level of the illumination source 201 is within a prescribed acceptable range. An initial drive current is desired because the optical output energy from the illumination source 201 changes due to temperature, age, device differences, etc. The lookup table also resides in the memory 112 of the system 200 and can be updated as required, thereby reducing iteration convergence time.

A temperature probe 203 is positioned near the illumination source 201 and the monitoring detector 205. Variations in the ambient temperature can affect the optical output energy levels of the illumination source 201 and the responsivity of the monitoring detector 205. The temperature probe 203 provides a real-time monitor of the ambient temperature of the illumination source 201 and the monitoring detector 205. The real-time ambient temperature can be used to compensate for variations in the optical output energy of the illumination source 201.

Variations in ambient temperature can affect the optical output energy of the illumination source 201 by as much as 20% within a reasonable operating temperature range of 15° C.–35° C. Additionally, ambient temperature variations can affect the responsivity of the monitoring detector 205. In one exemplary embodiment, photodiodes are used for the monitoring detector 205 because the photodiodes have a nominal variation within the above-described temperature range of about 10%.

The temperature probe 203 outputs the real-time ambient temperature of the illumination source 201 to the current controller 206 as a processed electrical signal. Accordingly, the temperature probe 203 helps the system 200 compensate for ambient operating conditions that would otherwise negatively affect the stability and performance of the illumination source 201.

The current controller 206 processes the electrical signal received from the temperature probe 203 and the output current received from the monitoring detector 205. The current controller 206 outputs a compensated drive current on the line 207 based on the data from the temperature probe 203 and the monitoring detector 205. The current controller 206 adjusts the optical output energy from the illumination source 201 using the compensated drive current output on the line 207. This adjustment persists until the optical output energy achieves a desired target point in agreement with the corresponding optical output energy for the appropriate reference illumination source 208 stored in the calibration table.

The target point is the level of the optical output energy from the illumination source 201 that illuminates the sample part 210, resulting in a consistent image of the sample part 210. In essence, the target point defines an image quality based on an illumination level rather than a device drive current level. The target point can be subjectively chosen by the operator to correspond to an acceptable quality image with which to perform dimensional inspection. Alternatively, the target point can also be objectively chosen by a suitable standard of measurement to provide the acceptable quality image. Additionally, the target point can be provided using a graphical user interface, passed as a specified value contained within a "part program", or determined from an appropriate algorithm. Thereafter, standardization and repeatability in establishing the same image brightness would follow a similar procedure.

To stabilize the system 200, the current controller 206 can also compensate for optical power changes. Such changes may result from differences in optical coupling efficiency and/or component variance among systems. Additionally, changes may result from low-frequency temperature drifts in the ambient environment that affect the illumination source 201 and the monitoring detector 205 or from current source fluctuations in driving the illumination source 201.

The remainder of the optical output energy emitted from the illumination source 201 is redirected onto the optical axis 219 of the light collection system 250. The redirected optical output energy is focused onto the sample part 110 using a focusing lens 204 to illuminate the sample part 110. The redirected optical output energy focused onto the sample part 110 reflects and/or scatters from the sample part 110 onto the optical axis 219. Some portion of the scattered energy from the sample part 110 is then gathered and recollected by the same focusing lens 204. The recollected energy is then imaged onto the CCD detector 211.

At least one characteristic of the optical output energy emitted by the illumination source 201 is measured by the monitoring detector 205. The characteristic of the optical output energy measured by the monitoring detector 205 is compared to a corresponding characteristic of the reference illumination source 208 stored in the calibration table, as the responsivity of the monitoring detector 205 will not measurably change. Any discrepancy between the optical output energy of the illumination source 201 and that of the corresponding value for the reference illumination source 208 found in the calibration table is minimized by adjusting the current output on the line 207 from the current controller 206 to the illumination source 201. The optical output energy emitted from the illumination source 201 is then remeasured by the monitoring detector 205. Iterative adjustment to obtain agreement between that measured from the illumination source 201 and the desired reference illumination source 208 is made based on an appropriate standard of measurement such as difference, maximum, minimum, etc.

Based on this iterative scheme, the drive current output by the current controller 206 on the line 207 to the illumination source 201 is adjusted to yield an illumination level onto the sample part 110 in accord with the reference illumination source 208.

The current controller 206 supplies a processed, compensated input drive current output on the line 207 to the illumination source 201 based on the real-time status of the optical output energy of the illumination source 201 via the monitoring detector 205 and the local environment temperature. Thus, the compensated input drive current signal output on line 207 is able to modify the optical output energy from the illumination source 201 so that it is in accordance with the reference illumination source 208. Hence, the current controller 206 adjusts the optical output energy emitted from the illumination source 201 using the compensated drive current signal output on line 207 until the optical output energy achieves the desired target point.

The illumination source 201 is capable of illuminating a sample part 110 with optical energy emitted from a color-addressable, solid-state device which is switchable from, for example, 360 nm to 1100 nm. As such, the illumination source 201 can optimally match or avoid the absorption properties of surface pigments which coat the sample part 110. The illumination source 201 can also provide radiation whose spectral content is sufficient to cover the visible region so that rudimentary color analysis within the field of view can be performed. Analysis of an independent measurement of the absorptive or reflective properties of the sample part 110 can establish the spectral region within which to optimally illuminate the sample part 110 to, for example, enhance the contrast In reflective or transmissive illumination, this measurement is accomplished on the collection device 150 or 250 side using color-ratiometric, opto-electronic detectors 214. In the ultra-violet and near infrared regions, custom multi-element detectors with appropriate filters are required.

For white light produced by a filament source or by solid-state devices activated in parallel to produce the white light, some of the reflected or scattered optical output energy from the sample part may be further redirected by a second optical element 215 positioned within the optical path onto one or more ratiometric detectors 214. The one or more ratiometric detectors 214 measure average scattered and reflected light from features in the field of view from the sample part 110 to estimate the red, green and blue components of color. Further, information indicating the color components allow the user to select the color of illumination used to optimize the image measurement.

Figure 5:
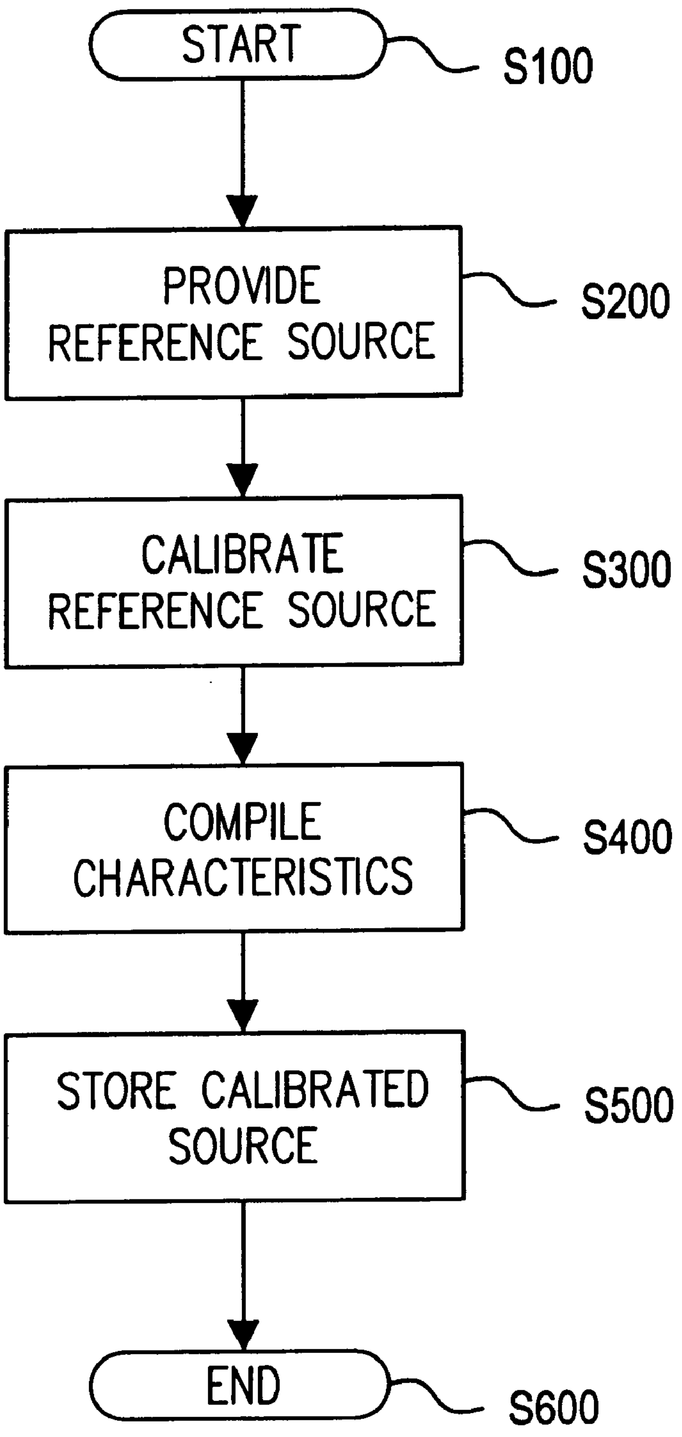
FIG. 5 is a flowchart outlining one exemplary embodiment of a method for calibrating a reference illumination source according to this invention.

FIG. 5 is a flowchart outlining one exemplary embodiment of a method for calibrating a reference illumination source according to this invention. Beginning in step S100, control continues to step S200, where a reference illumination source is provided. Next, in step S300, the reference illumination source is calibrated.

Then, in step S400, the characteristics of the optical output energy of the reference illumination source are compiled. Next, in step S500, each calibrated reference illumination source is stored to preserve integrity except when used to calibrate machine vision instruments. Then, in step S600, the reference illumination source calibration method ends.

Figure 6:
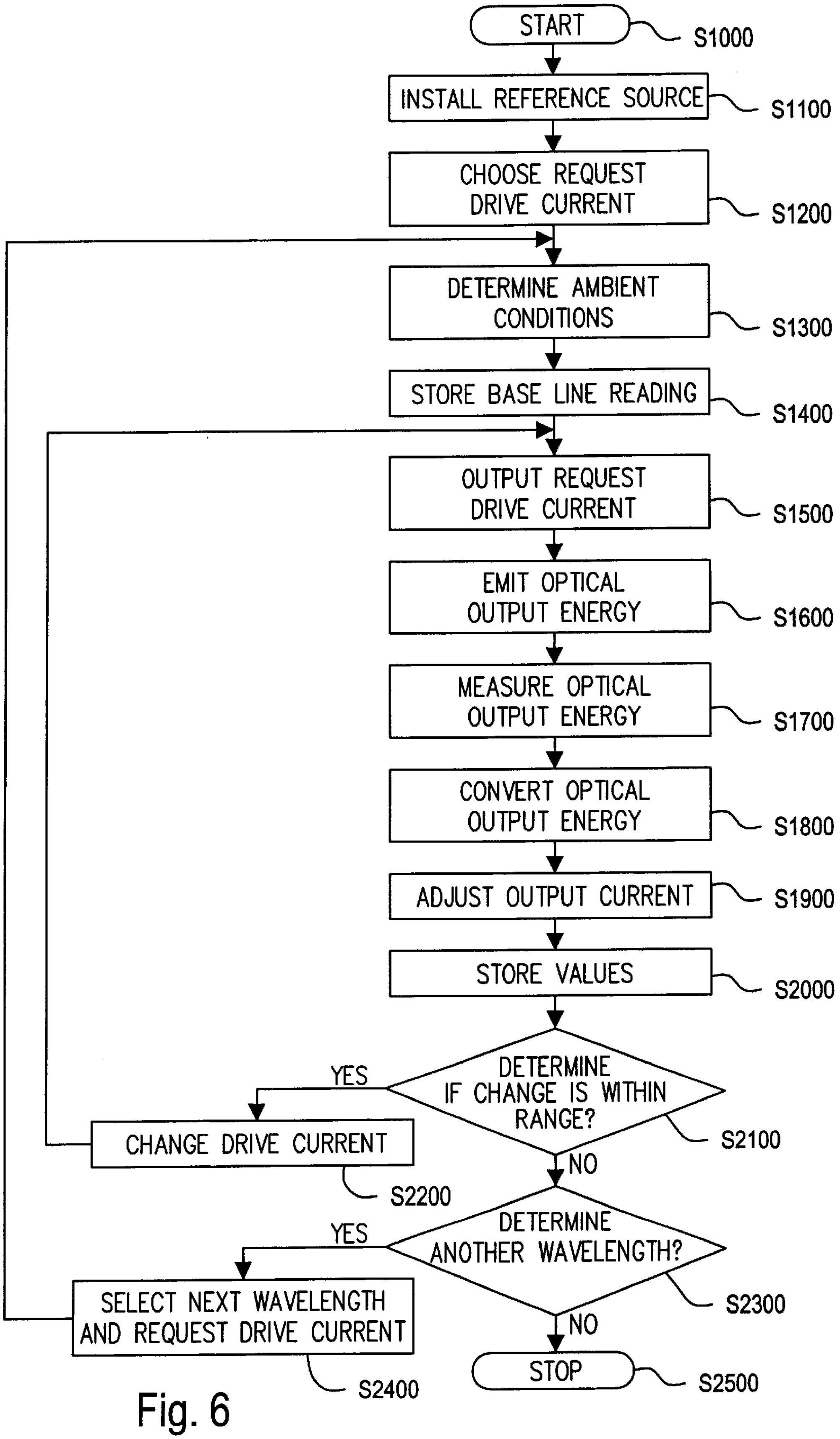
FIG. 6 is a flowchart outlining one exemplary embodiment of a method for generating a calibration table using a reference illumination source according to this invention.

FIG. 6 is a flowchart outlining in greater detail one exemplary embodiment of the method for generating a calibration table using a reference illumination source of FIG. 5. Beginning in step S1000, control continues to step S1100, where the reference illumination source is temporarily installed into the machine vision instrument in the exact position the permanent illumination source is to be located. Next, in step S1200, a request drive current is chosen for the wavelength of the initial optical output energy to be emitted by the reference illumination source. Then, in step S1300, the ambient background light contribution and average temperature conditions are determined to obtain a temperature-compensated base line reading without sample illumination. Control then continues to step S1400.

In step S1400, the base line reading is stored. Then, in step S1500, the request drive current is output. Next, in step S1600, optical output energy is emitted by the reference illumination source. Then, in step S1700, a portion of the entire emitted optical output energy is measured to determine at least one characteristic of the emitted optical output energy. Control then continues to step S1800.

In step S1800, the measured optical output energy is converted to an output current. Next, in step S1900, the output current representing the emitted optical output energy is adjusted to compensate for the measured ambient conditions. Then, in step S2000, the compensated optical output energy, compensated reference illumination source optical input and the request drive current of the reference illumination source are stored in the calibration table. Control then continues to step S2100.

In step S2100, the request drive current is checked to determine if an incremental change in the request drive current can be made within the operating range of the reference illumination source. If so, control continues to step S2200. Otherwise, control jumps to step S2300. In step S2200, the request drive current is changed an incremental amount. Control then returns to step S1500.

If, in step S2100 another incremental change in the request drive current cannot be made within the operating range of the reference illumination source, control jumps to step S2300. In step S2300, for a multi-color addressable reference illumination source, the next color is selected so that an identical calibration table can be generated for the new color. If another color can be selected, control continues to step S2400. Otherwise, control continues to step S2500.

In step S2400, the wavelength of the next color is selected, a request drive current is chosen and generation of a calibration table corresponding to the wavelength of the new color is started. Control then returns to step S1300. In step S2500, the method ends.

Figure 7:
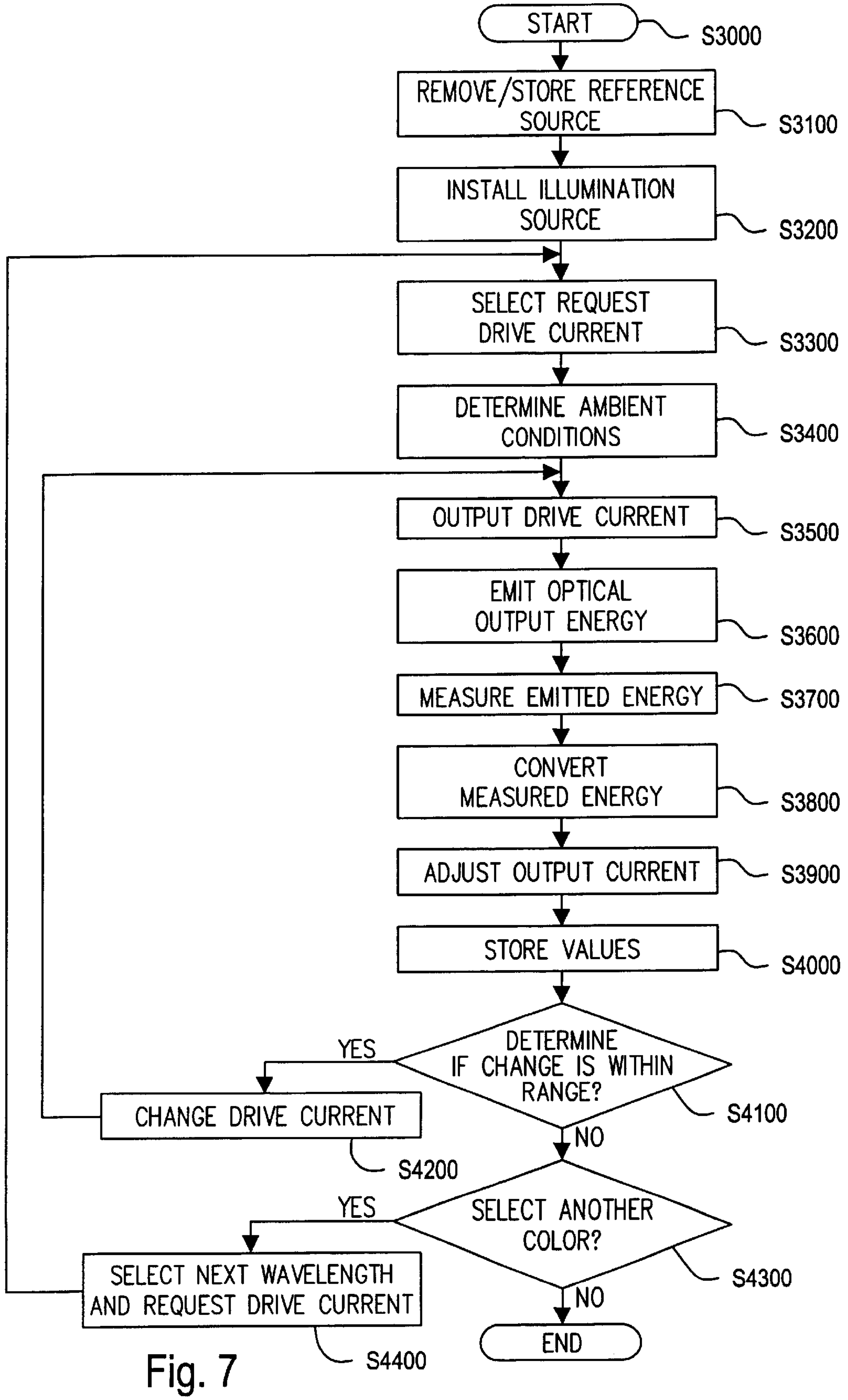
FIG. 7 is a flowchart outlining one exemplary embodiment of a method for generating a lookup table using the illumination source according to this invention.

FIG. 7 is a flowchart outlining one exemplary embodiment of a method for generating a lookup table using the instrument illumination source. Beginning in step S3000, control continues to step S3100, where the reference illumination source is removed and stored. Then, in step S3200, the illumination source is permanently installed. Next, in step S3300, a request drive current is selected for the wavelength of the initial optical output energy to be emitted by the instrument illumination source. Control then continues to step S3400.

In step S3400, the ambient background light contribution and average temperature conditions are determined to obtain a temperature-compensated base line reading without sample illumination. Next, in step S3500, the request drive current is output to the illumination source. Then, in step S3600, optical output energy is emitted by the illumination source. Control then continues to step S3700.

In step S3700, a portion of the entire emitted optical output energy is measured to determine at least one characteristic of the emitted optical output energy. Next, in step S3800, the measured optical output energy is converted to an output current. Then, in step S3900, the output current representing the emitted optical output energy is adjusted to compensate for the measured ambient conditions of background light contribution and average temperature. Control then continues to step S4000.

In step S4000, the compensated optical output energy, compensated reference illumination source optical input and the request drive current of the reference illumination source are stored in the lookup table. Next, in step S4100, the request drive current is checked to determine if an incremental change in the request drive current can be made within the operating range of the instrument illumination source. If so, control continues to step S4200. Otherwise, control jumps to step S4300.

In step S4200, the request drive current is changed an incremental amount. Control then returns to step S3500. If, in step S4100 another incremental change in the request drive current cannot be made within the operating range of the instrument illumination source, control jumps to step S4300. In step S4300, for a multi-color addressable instrument illumination source, the next color is selected so that an identical calibration table can be generated for the new color. If a remaining color can be selected, control continues to step S4400. Otherwise, control continues to step S4500.

In step S4400, the wavelength of the next color is selected, a request drive current is chosen, and generation of a lookup table corresponding to the wavelength of the new color is started. Control then returns to step S3300. In step S4500, the method ends.

It should be appreciated that steps S3100 and S3200 can be performed independently of steps S3300–S4500. Thus, steps S3100–S3200, if performed at some earlier time, and/or performed by another, can be omitted from the method of steps S3300–4500 without changing the results of steps S3300–S4500.

Figure 8:
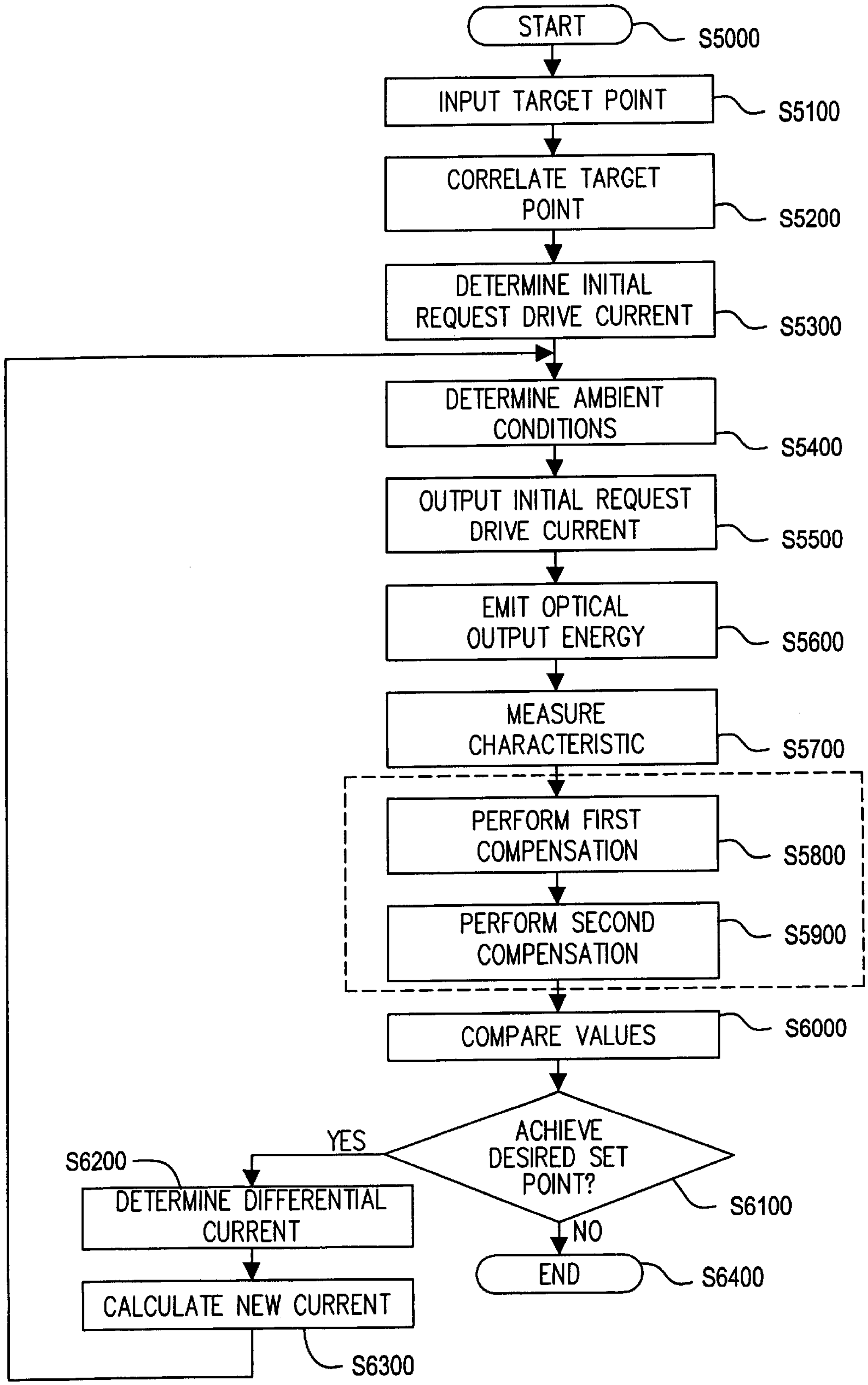
FIG. 8 is a flowchart outlining one exemplary embodiment of a method for controlling a drive current according to this invention.

FIG. 8 is a flowchart outlining one exemplary embodiment of a method for controlling a drive current of an instrument illumination source according to this invention. Beginning in step S5000, control continues to step S5100, where a target point is input Next, in step S5200, the target point is correlated to a measured characteristic of the optical output energy of a reference illumination source from the calibration table. Then, in step S5300, the previously measured reference characteristic from the calibration table is compared to a measured characteristic of the optical output energy of the instrument illumination source yielding an initial request drive current for the chosen color/wavelength. Control then continues to step S5400.

In step S5400, the ambient background light contribution and average temperature conditions are determined to obtain a temperature-compensated base line reading without sample illumination. Next, in step S5500, the initial request drive current is output to the illumination source. Then, in step S5600, optical output energy is emitted by the illumination source. Control then continues to step S5700.

In step S5700, at least one characteristic of the optical output energy emitted by the illumination source is measured. Next, in step S5800, a first compensation for the effect of the ambient temperature on the responsivity of the monitoring detector is performed. Then, in step S5900, a second compensation for the effect of the ambient temperature on the optical output energy of the illumination source is performed. Control then continues to step S6000.

In step S6000, the fully compensated measurement is compared to measurements from the reference illumination source stored in the calibration table. Then, in step S6100, the actual target point is compared to the desired target point. If the actual target point is not within a predetermined tolerance, control continues to step S6200. Otherwise, control continues to step S6400.

In step S6200, a differential drive current is determined. Next, in step S6300, a new drive current is determined from the differential drive current and the request drive current. Control then returns to step S5500. In contrast, step S6400, the method ends.

It should be appreciated that, if one or more of the temperature or other ambient condition sensors are not provided, then one or both of steps S5800 and S5900 can be omitted from the method outlined in FIG. 8.

As shown in FIGS. 1 and 4, the current controller 106 and 206 supplies a processed, compensated drive current on the line 107 and 207 to the illumination source 101 and 201. Thus, the current controller 106 or 206 can be implemented on a general purpose computer, a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, of the like. In general, any device, capable of implementing a finite state machine that is in turn capable of implementing the control routines shown in the flowcharts of FIGS. 5–8 and can be used to implement the current controller 106 or 206.

While the invention has been described in conjunction with specific exemplary embodiments outlined above, it is evident that many alternatives, modifications and variations may be apparent to those skilled in the art. Accordingly, the preferred embodiments of the invention as set forth herein are intended to be illustrative, not limiting. Various changes may be made without departing from the spirit and scope of the invention.

What is claimed is:

1. A system that generates reproducible illumination of a sample, the system comprising:

an illumination source that emits light onto the sample;

a monitoring detector that measures at least one characteristic of the emitted light independent of image capture apparatus; and a current controller that modifies a drive current supplied to the illumination source based on the measured characteristics and a plurality of predetermined reference values corresponding to a reference illumination source illuminating the monitoring detector, the current controller correlating the measured characteristics to the predetermined reference values.

2. The system according to claim 1, wherein the illumination source has at least one solid state device.

3. The system according to claim 2, wherein at least one solid state device of the illumination source is at least one LED.

4. The system according to claim 3, wherein the illumination source includes at least one LED and a collection lens.

5. The system according to claim 1, wherein the illumination source is near the sample.

6. The system according to claim 1, further comprising a temperature probe positioned near the illumination source, the temperature probe measuring an ambient temperature around the illumination source, the current controller further modifying the drive current supplied to the illumination source based on the measured ambient temperature.

7. The system according to claim 6, wherein the measured ambient temperature is acquired in real-time and coincident with the measurement from the monitoring detector.

8. The system according to claim 1, further comprising a temperature probe positioned near the motoring detector, the temperature probe measuring an ambient temperature around the monitoring detector, the current controller further modifying the drive current supplied to the illumination source based on the measured ambient temperature.

9. The system according to claim 8, wherein the measured ambient temperature is acquired in real-time and coincident with the measurement from the monitoring detector.

10. The system according to claim 1, further comprising at least one spatially-indiscriminate, wavelength-rationing detector positioned near the sample, each spatially-indiscriminate, wavelength-rationing detector measuring scattered and/or reflected light from the sample, the current controller further modifying the drive current supplied to the illumination source based on the measured scattered and/or reflected light.

11. The system according to claim 1, wherein the measured characteristic of the emitted light measured is at least one of a color-combined light intensity output and a light intensity output of at least one of a discrete color and a wavelength region of the emitted light.

12. The system according to claim 1, wherein the current controller is provided a target point and the current controller further modifies the drive current based on the target point.

13. A method for generating reproducible illumination from an illumination source to illuminate a sample, comprising:

providing a drive current to the illumination source;

emitting light from the illumination source towards a sample based on the drive current to illuminate the sample;

measuring at least one characteristic of the emitted light using a monitoring detector; and modifying the drive current based on the measured characteristics and a plurality of predetermined reference values that correlate measured characteristics determined by the monitoring detector to optical output energy emitted from a reference illumination source.

14. The method according to claim 13, further comprising positioning the illumination source near the sample, wherein the illumination source has at least one solid state device.

15. The method according to claim 13, further comprising:

measuring an ambient temperature of the illumination source; and further modifying the drive current based on the measured ambient temperature.

16. The method according to claim 13, further comprising:

measuring an ambient temperature of the monitoring detector; and further modifying the drive current based on the measured temperature.

17. The method according to claim 13, further comprising:

measuring scattered and/or reflected light from the sample; and further modifying the drive current based on the measured scattered and/or reflected light.

18. The method according to claim 13, further comprising:

inputting a target point; and further modifying the drive current based on the target point.

19. The method according to claim 13, wherein at least one solid state device of the illumination source is at least one LED.

20. The method according to claim 13, wherein the illumination source includes a collection lens.

* * * * *